Figure 1:
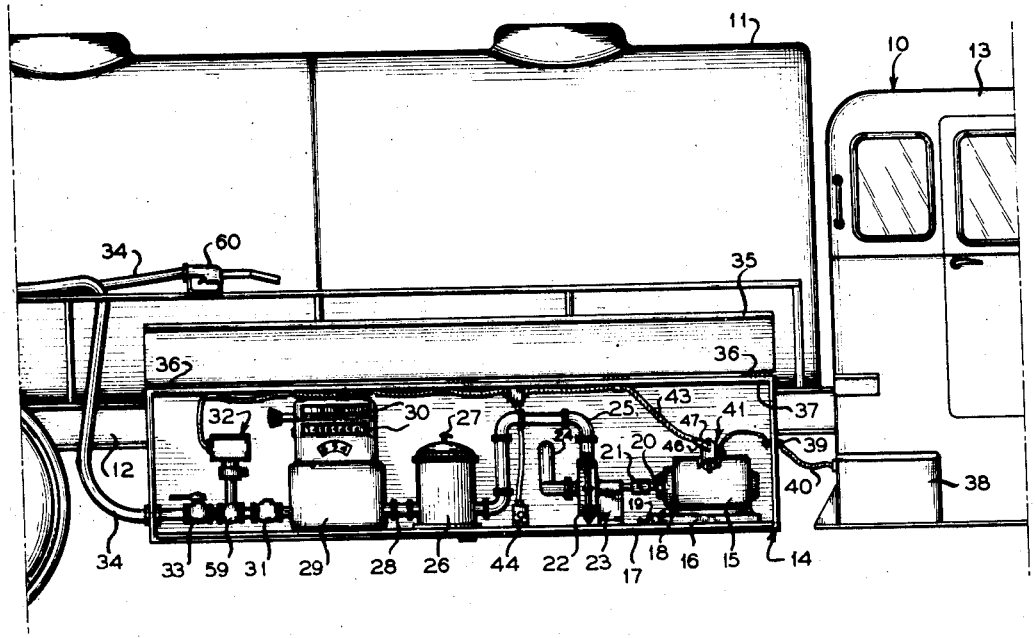

May 18, 1954          E. A. WEST          2,678,752
OIL DISPENSING APPARATUS
Filed June 20, 1951

INVENTOR.
E. A. WEST
BY
A. Yates Dowell
ATTORNEY

Patented May 18, 1954

2,678,752

UNITED STATES PATENT OFFICE 2,678,752

OIL DISPENSING APPARATUS

Elias Angelo West, Lumberton, N. C.

Application June 20, 1951, Serial No. 232,601

1 Claim. (Cl. 222—63)

This invention relates to fluid handling, and more particularly to the metering and dispensing of fluid wherein the flow of the fluid is produced by a pump driven by a motor, or the like.

Specifically, the invention relates to metering and dispensing mechanism which may be used for the metering and dispensing of oil or other liquids, and the manner of energizing the motor which drives the pump for producing the flow of the fluid dispensed.

In the fluid dispensing systems of the above character, it has been customary to operate a motor switch manually, either in the vicinity of the pump or the nozzle, regardless of whether the dispensing mechanism was of the stationary or portable variety. This manual operation of a control switch, or the like, for energizing the pump driving motor has required that the operator manipulate the switch, go to the dispensing nozzle for dispensing, and then go back and turn off the switch after completion of the dispensing operation. Thus the motor and associated parts were in operation far longer than was necessary, with the resultant wear and early loss of efficiency or failure.

To overcome this, instead of the switch controlling the operation of the motor being placed on or near the pump it has been placed on the nozzle, and the operator has only had to operate the switch from the nozzle to start and stop the pump driving motor. This type of structure involves a connection along the hose to the switch at the nozzle, either within or exteriorly of the hose, and the location of the switch in relatively close proximity to the volatile fluid dispensed. This was likewise unsatisfactory.

Therefore, it is an object of the invention to overcome the above defects and to provide simple, inexpensive, practical or commerically feasible fluid metering and dispensing apparatus, including means for automatically producing flow of fluid instantly when the same is desired, and to terminate the flow of fluid in like manner.

Another object of the invention is to provide fluid metering and dispensing apparatus of relatively few and conventional parts, combined in a manner that the flow of fluid will be initiated automatically, and where the fluid is highly volatile there will be the maximum safety factor, due to the absence of electrical contacts near the fluid and particularly along the dispensing hose.

A further object of the invention is to provide a simple and highly effective control for fluid flow producing means, subject to fluid pressure in the line near the discharge end thereof, and the utilization of minimum hose between the pump and the discharge from the dispensing mechanism.

Figure 2:
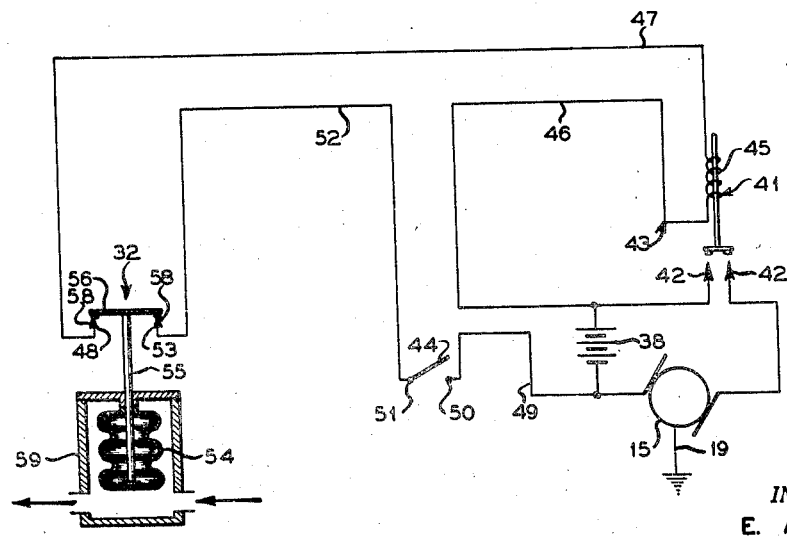

Further objects and advantages of the invention will be apparent from the following description taken in conjunction with the accompanying drawings, wherein:

Fig. 1 is a fragmentary elevational view illustrating a fluid dispensing unit attached to a tank truck in accordance with one embodiment of the present invention; and Fig. 2, a circuit diagram illustrating the manner in which the operation of the dispensing unit is controlled.

With continued reference to the drawing there is shown in Fig. 1 a conventional tank truck 10 or other suitable fluid container. This truck includes a tank or container 11 mounted on a chassis 12, as well as the usual driver's cab 13.

The fluid dispensing apparatus of this invention may be conveniently incorporated in an elongated housing 14 which may be attached to or suspended from the chassis 12 in any desired manner. As shown in Fig. 1 the housing 14 is secured to the side of the chassis 12 somewhat below the midpoint of the tank or container 11 and in such a position that convenient connection may be made to the outlet of the tank.

The housing 14 may serve to contain and support the various units forming the fluid dispensing apparatus of this invention and these units may conveniently comprise a motor 15 having a base 16 secured to the bottom wall 17 of the housing 14 by screw fastening means or the like 18. In order to reduce the likelihood of sparks which might ignite the fluid being dispensed the motor 15 may be grounded to the bottom wall 17 of the housing 14 by a grounding strap 19.

The drive shaft 20 of the motor 15 is connected through a coupling 21 with a pump 22 which is supported by a base 23 on the bottom wall 17 of the housing 14. Pump 22 is provided with an inlet pipe 24 connected to the outlet of the tank or container 11 and a discharge pipe 25 leads from the pump 22 to an air trap or air eliminator 26. This air trap 26 is conventional in construction and serves to remove air entrained in the fluid being delivered from the pump in order that such entrained air will not affect the metering of the fluid delivered by the dispensing apparatus. The air trap 26 may be provided at the upper end thereof with a petcock 27 which may be utilized to vent the air therefrom when necessary.

A pipe 28 leads from air trap 26 to a recording type meter 29 which is of conventional construction, this meter having scales 30 which serve to indicate the total gallonage dispensed as well as the number of gallons dispensed to each consumer.

The outlet of meter 29 is connected through a check valve 31 to a pressure switch 32, the operation of which will be presently described. Pressure switch 32 is connected through a manually operated shut-off valve 33 with a delivery hose or other suitable conduit 34. In order to protect the apparatus contained within housing 14 against damage or unauthorized access thereto may be provided a closure in the form of a door 35 pivotally mounted at 36 to the upper wall 37 of the housing 14, door 35 serving to cover the opening in housing 14 when access to the apparatus is not desired.

Power for operating the dispensing apparatus of this invention may be supplied from the conventional storage battery 38 commonly found on tank trucks and the housing 14 may be provided with suitable connections 39 externally thereof which serve to connect the apparatus through the cable 40 with the storage battery 38. A solenoid switch 41 may be mounted on motor 15 or in any other suitable location and this switch 41 which is normally open includes a pair of contacts 42 which serve to control the operation of motor 15 which drives the pump 22. A control circuit cable 43 leads from switch 41 to a manually operated switch 44 and to pressure operated switch 32.

As shown in Fig. 2 electrical current from battery 38 serves to energize motor 15 when the solenoid switch 41 is closed and for controlling the operation of solenoid switch 41 the coil 45 thereof is connected through a lead 46 with the battery 38 and through another lead 47 with one contact 48 of pressure operated switch 32. The opposite side of battery 38 is connected through a lead 49 with one contact 50 of manually operated switch 44 and the other contact 51 of switch 44 is connected through a lead 52 with the other contact 53 of pressure operated switch 32. Pressure operated switch 32 is shown schematically and may include a bellows 54 which serves to actuate a slidable rod 55 to which is attached a cross arm 56 carrying contacts 58 which serve to engage the contacts 48 and 53 to close the circuit.

The bellows 54 is enclosed in a chamber 59 which is subjected to the pressure of the fluid flowing from the pump 22 through the air trap 26, meter 29, and check valve 31, whereby, upon a sufficient increase in pressure within chamber 59, the bellows 54 will be collapsed, moving the rod 55 and cross arm 56 upwardly to separate the contacts 58 from contacts 48 and 53, thus opening the circuit. Upon reduction of pressure within the chamber 59, the bellows 54 will expand, moving the rod 55 and cross arm 56 downwardly, thus reengaging contacts 58, 48 and 53 to reestablish the control circuit.

Assuming that it is desired to make a delivery of oil or other fluid from tank or container 11, the manual switch 44 will be closed to energize the coil 45 of the solenoid switch 41 thus closing this switch and energizing the motor 15. This will cause operation of the pump 22 and build up a pressure in the discharge line 25 thereof and in the chamber 59 of pressure operated switch 32. Upon this pressure reaching a predetermined value, switch 32 will open thus opening the solenoid switch 41 and stopping operation of the pump. The discharge hose 34 will be connected to the customer's tank or other receptacle and the valve 33 opened which will immediately reduce pressure in the chamber 59 thus closing the pressure operated switch 32 which will result in starting the motor 15 and operation of the pump 22 to deliver fluid through the hose 34, the amount of such fluid being recorded by the meter 29. Upon delivery of the desired quantity of fluid, the valve 33 will be closed which will cause an immediate rise in pressure within the chamber 59 thus opening the switch 32 and causing the motor 15 to stop whereby the delivery operation is completely under the control of the operator at all times. Obviously if desired a control valve or nozzle 60 may be provided on the outlet of hose 34 which would result in complete remote control of the operation of the dispensing unit without the necessity of providing electrical leads to the point of delivery.

It will be seen that by the above described invention there has been provided a relatively simple economically constructed fluid dispensing apparatus in which all of the elements comprise commercially available parts these elements being assembled into an apparatus and incorporating a control circuit which permits complete and accurate remote control of the operation thereof. This apparatus also lends itself to the provision of a compact unitary device which may be contained in a relatively small housing to be attached to a tank truck or which may be utilized at a stationary installation it only being necessary to connect the inlet of the pump to the outlet of the tank and provide a source of electric power for the pump driving motor and in the case of a tank truck this source of electric power may conveniently comprise the conventional storage battery normally found on such trucks.

It will be obvious to those skilled in the art that various changes may be made in the invention without departing from the spirit and scope thereof and therefore the invention is not limited by that which is shown in the drawings and described in the specifications but only as indicated in the appended claim.

What is claimed is:

Oil dispensing apparatus comprising a container for oil to be dispensed, a pipe for discharging oil from said container, said pipe being connected to said container adjacent the bottom of the same, a pump for receiving oil from said discharge pipe, a motor for driving said pump, a pipe leading from said pump to an air eliminator, from said air eliminator to a meter, from said meter to a check valve, from said check valve to a pressure responsive element of a pressure switch, from said pressure responsive element to a hand valve, and from said hand valve to a nozzle, a source of electrical energy for said motor, and control means for said pump comprising a solenoid switch for controlling the supply of current to said motor, electrical connections between said pressure operated switch and said solenoid switch whereby upon an increase in pressure in the discharge line the solenoid switch will be actuated to interrupt the supply of current to the motor and upon reduction of pressure in the discharge line the pressure operated switch will be actuated to restore the supply of current to the motor.

References Cited in the file of this patent

UNITED STATES PATENTS

| Number | Name | Date |
| --- | --- | --- |
| 763,741 | Ellis | June 28, 1904 |
| 1,638,189 | Du Pont | Aug. 9, 1927 |
| 1,902,750 | Barks | Mar. 21, 1933 |
| 1,981,160 | Baldwin | Nov. 20, 1934 |
| 1,990,742 | Marvel | Feb. 12, 1935 |
| 2,239,207 | Trexler | Apr. 22, 1941 |
| 2,264,344 | Svenson | Dec. 2, 1941 |
| 2,276,838 | Grise | Mar. 17, 1942 |
| 2,307,060 | Moore et al. | Jan. 5, 1943 |
| 2,373,143 | Samiran | Apr. 10, 1945 |
| 2,507,597 | Holdridge | May 16, 1950 |
| 2,514,441 | Brown | July 11, 1950 |